United States Patent [19]

Skiscim

[11] Patent Number: 4,657,983

[45] Date of Patent: Apr. 14, 1987

[54] PHOSPHATE ESTERS OF ACRYLATED GLYCIDYL ESTER COPOLYMERS

[75] Inventor: Ronald J. Skiscim, Crestwood, Ky.

[73] Assignee: Interez, Inc., Jeffersontown, Ky.

[21] Appl. No.: 678,528

[22] Filed: Dec. 5, 1984

[51] Int. Cl.[4] ............................................ C08F 261/06
[52] U.S. Cl. .................................... 525/255; 428/418; 522/100; 522/102; 522/171; 525/286; 525/301
[58] Field of Search ....................... 525/255, 286, 301; 526/273

[56] References Cited

U.S. PATENT DOCUMENTS 3,418,295 12/1968 Schoenthaler ........................ 526/273
3,437,514 4/1969 Burlant ............................. 117/93.31
4,434,278 2/1984 Skiscim ................................ 525/531

OTHER PUBLICATIONS

Industrial Engineering Chemistry, Prod. Res. Develop., vol. 9, No. 2, 1970, pp. 155–158, (Authors J. D. Nordstrom and J. E. Hinsch), Acrylic Copolymers for Radiation-Cured Coatings.

*Primary Examiner*—Jacob Ziegler
*Attorney, Agent, or Firm*—Herbert P. Price

[57] ABSTRACT

Radiation curable copolymers useful in coating compositions are prepared by reacting part of the glycidyl groups of a glycidyl acrylate copolymer with acrylic or methacrylic acid followed by esterifying the remaining glycidyl groups with phosphoric acid.

18 Claims, No Drawings

PHOSPHATE ESTERS OF ACRYLATED GLYCIDYL ESTER COPOLYMERS

BACKGROUND OF THE INVENTION

The field of art to which this invention pertains is radiation curable acrylic acrylate copolymers containing pendant acrylic ester groups.

Phosphate esters of partially acrylated glycidyl polyethers of polyhydric phenols are described in my U.S. Pat. No. 4,434,278 which issued Feb. 28, 1984. Acrylated esters of glycidyl methacrylate copolymers are described in U.S. Pat. No. 3,437,514 and in Industrial Engineering Chemistry, Prod. Res. Develop, Vol. 9, No. 2, pp. 155–158 (1970).

SUMMARY OF THE INVENTION

This invention is directed to radiation curable copolymers made by reacting acrylic or methacrylic acid with part of the glycidyl groups of a copolymer of glycidyl acrylate or methacrylate followed by reacting phosphoric acid with the remainder of the glycidyl groups. The copolymer contains about 5 to about 75 weight percent, preferably, about 10 to about 50 weight percent, glycidyl acrylate or methacrylate with the remainder being an ethylenically unsaturated monomer copolymerizable therewith. About 25 to about 75 percent of the equivalents of the glycidyl groups are reacted with acrylic or methacrylic acid. The remainder of the glycidyl groups are reacted with phosphoric acid. The reaction with the phosphoric acid is conducted in the presence of at least one equivalent of water and/or aliphatic hydroxyl compound per mole of phosphoric acid.

DESCRIPTION OF THE INVENTION

The glycidyl acrylate or methacrylate copolymers useful in this invention are copolymers of glycidyl acrylate or methacrylate with ethylenically unsaturated monomers copolymerizable therewith. The copolymers contain about 5 to about 75 weight percent glycidyl acrylate or methacrylate. The comonomers contain no groups which are reactive with carboxylic acids or phosphoric acid. Examples of such monomers include acrylate or methacrylate esters having 1 to about 20 carbon atoms in the esterified alcohol group, vinyl aromatic hydrocarbons, vinyl esters, vinyl halides and the like. Such monomers include methyl acrylate, ethyl acrylate, butyl acrylate, 2-ethylhexyl acrylate, dodecyl acrylate, methyl methacrylate, butyl methacrylate, nonyl methacrylate, lauryl methacrylate, styrene, vinyl toluene, alpha methyl styrene, vinyl acetate, vinyl propionate, vinyl chloride, vinylidene chloride and the like. Useful copolymers have molecular weights of about 5,000 to about 250,000 and, preferably, about 10,000 to about 50,000.

The glycidyl acrylate or methacrylate copolymers are made by well-known techniques using free radical polymerization conditions. The molecular weight is controlled by methods well-known in the art. Such methods include thermal control, quantity and type of free radical catalyst and the use of "chain-stoppers", such as mercaptans and alcohols.

The polymerization reaction can be conducted in the presence or absence of solvents or in the presence of reactive diluents, e.g., low molecular weight glycidyl ethers of polyhydric alcohols or phenols, such as those described in my U.S. Pat. No. 4,434,278 which is hereby incorporated by reference. Useful solvents include toluene, xylene, acetone, methylethyl ketone, methylisobutyl ketone, and the like.

The unsaturated acids which are reacted with the glycidyl acrylate or methacrylate copolymer are acrylic and methacrylic acid with acrylic acid being preferred. The terms "acrylic acid" and "acrylate esters" as used herein are intended to include methacrylic acid and methacrylate esters as well as acrylic acid and acrylate esters The phosphoric acid used in this invention is ortho phosphoric acid and can be utilized in its pure crystalline form or as its hydrate. Various condensed forms of phosphoric acid, pyrophosphoric acid and triphosphoric acid can also be used provided sufficient water or aliphatic hydroxyl compound is used as described hereinafter. It is preferred to use phosphoric acid in its usual commercial form which is referred to as concentrated phosphoric acid and is about 80–90 weight percent in water.

In preparing the radiation curable products of this invention, the first reaction is that of the acrylic acid with the glycidyl acrylate copolymer. Sufficient acrylic acid is used to react about 25 to about 75 percent of the equivalents of the glycidyl groups to form the acrylate ester, leaving the remainder of the glycidyl groups for the subsequent reaction with phosphoric acid. The esterification of the glycidyl groups with the acrylic acid is conducted at a temperature of about 60° C. to about 150° C. and, preferably, from about 100° C. to about 140° C. The reaction is conducted until the acid value indicates that the esterification reaction is substantially complete, i.e., when the acid value is reduced below 10. The time for the reaction to be completed will vary from about 30 minutes to about 5 hours depending on the particular reaction conditions.

In order to keep to a minimum the amount of acrylic acid polymerization which can occur during esterification, about 0.01 to 3.0% by weight, based on the total reaction mixture, of a polymerization inhibitor can be added. Examples of such materials include the quinones, such as hydroquinone and its monomethyl ether and the various phenols, such as p-tert-butylcatechol, p-methoxyphenol, 2,4-dichloro-6-nitrophenol, di-tert-butyl-p-cresol, paramethoxyphenol, and the like. Other inhibitors are p-benzoquinone, 2,6-dichloro-p-benzoquinone, nitrobenzene, phenothiazine, hexamethylphosphoramide, n-dodecyl mercaptan, benzenethiol, divinylacetylene and various antimony and copper salts. Preferred among the inhibitors are paramethoxyphenol, hydroquinone and its monomethyl ether, phenothiazine and nitrobenzene.

In order to complete the esterification reaction at a low temperature and a reasonable reaction rate, an esterification catalyst of conventional type can be added to the reaction mixture. The esterification catalyst should be added in the range of about 0.1–10 percent, preferably, 1–5 percent, based on the total amount of the reactants. Suitable esterification catalysts are para-toluene sulfonic acid (PTSA) and methane sulfonic acid, as well as titanium esters, titanium chelates, or aluminum, bismuth, barium, zinc, copper, tin, chromium, calcium, antimony or cadmium alcoholates, carboxylate esters, halides or alkyl oxides and alkyl aryl ammonium halide salts.

The esterification catalyst may be removed from the reaction medium by means of a cation exchange resin.

This resin may be added directly to the reaction mixture and then filtered off, or the finished product may be passed through a cation exchange column. The preferred type of cation exchange resin is of the tertiary amine type. In the alternative the insoluble salt of the reaction catalyst is formed such as by adding ammonia to a PTSA catalyst system. The reaction mixture is then filtered to remove the salted catalyst. In some cases, the esterification catalyst can be retained in the product when its presence will not be deleterious to the final product properties.

Following completion of the esterification reaction between the acrylic acid and the glycidyl acrylate copolymer as measured by a reduction to a minimum of the acid value of the reaction mixture, the temperature of the reactants is adjusted, if necessary, and the phosphoric acid is added in the requisite amount.

The reaction between the phosphoric acid and the acrylated glycidyl acrylate copolymer is conducted at temperatures in the range of from about 35° C. to about 125° C., and, preferably, from about 60° C. to about 90° C. The reaction is followed by monitoring the disappearance of epoxide content of the system. Full reaction is usually attained in about 30 minutes to about 5 hours.

Sufficient phosphoric acid is used to react with the remainder of the glycidyl groups left after the acrylic acid esterification. The amount of phosphoric acid will vary from about 0.5 mole to 1 mole of phosphoric acid per each equivalent of glycidyl ester left unreacted. When 0.5 mole of phosphoric acid is used, a diester is formed. When one mole is used a monoester is formed. When more than 0.5 and less than 1 mole is used mixtures of diesters and monoesters are formed.

If polyepoxides are used as reactive diluents in the polymerization of glycidyl acrylate and comonomers, then in the subsequent reactions, the epoxide groups of the polyepoxide resin are treated as glycidyl acrylate groups in calculating the amount of acrylic acid and phosphoric acid that is to be reacted. The reaction of the acrylic acid and phosphoric acid with the polyepoxide is the same as that described in my U.S. Pat. No. 4,434,278.

The reaction between the acrylated glycidyl acrylate copolymer and the phosphoric acid proceeds smoothly and without gelation when water and/or a compound having an aliphatic hydroxyl group is employed. Such aliphatic hydroxyl containing compounds include $C_1$–$C_{20}$ alcohols, glycols, triols, glycol ethers and the like. Examples of such compounds are methanol, ethanol, isopropanol, butanol, 2-ethylhexanol, decanol, hexadecanol, glycerine, trimethylolethane, trimethylolpropane, ethylene glycol, propylene glycol, butylene glycol, monomethylether of ethylene glycol, monoethylether of ethylene glycol, monobutyether of ethylene glycol, monomethylether of diethylene glycol and the like. The amount of hydroxyl that is added is at least about 1 equivalent of hydroxyl per mole of phosphoric acid that is utilized. Although there is no upper limit to the amdunt of hydroxyl that can be added, from a practical standpoint no more than about 5 equivalents are utilized. The amount of water that is added includes, of course, the water which is added with the phosphoric acid. The preferred hydroxyl compound is water and the lower alcohols, with water being most preferred. Mixtures of water and hydroxyl compound can be used as long as the total equivalents of hydroxyl are within the minimum amount. Polymerizable hydroxyl containing monomers can also be used as the hydroxyl compound, examples of such compounds being hydroxyethyl acrylate, hydroxypropyl acrylate, hydroxypropyl methacrylate, allyl alcohol, methallyl alcohol and the like.

It has been found that carrying out the phosphating reaction in a reactive diluent produces products which have improved storage stability. For convenience in conducting the reaction, both stages of the reaction, i.e., the acrylic-epoxy reaction and the phosphoric-epoxy reaction, can be conducted in the reactive diluent. Reactive diluents as used herein are compounds which contain one up to about six unsaturated groups per molecule which can be polymerized by radiation. The reactive diluents useful in this invention have viscosities of less than 2000 cps at 75° C. and which are liquid at room temperature (25° C), i.e., not gaseous or crystalline. Examples of reactive diluents are acrylate and methacrylate esters of $C_1$–$C_{12}$ monohydric alcohols, vinyl esters of $C_2$–$C_4$ monocarboxylic acids, vinyl aromatic monomers, vinyl heterocyclic monomers, acrylate and methacrylate esters of polyols, polyalkoxyalkyl esters of acrylic and methacrylic acid and the like. Specific examples of such compounds include vinyl acetate, ethyl acrylate, 2-ethylhexyl acrylate, methyl methacrylate, styrene, vinyl pyrrolidone, ethoxyethoxyethyl acrylate, hexanediol diacrylate, trimethylolpropane triacrylate, tripropylene glycol diacrylate, trimethylolethane trimethacrylate, pentaerythritol tetraacrylate, dipentaerythritol hexaacrylate, and the like. The amount of reactive diluent used will vary from about 0 to about 75 weight percent, preferably from about 20 to about 50 weight percent, based on the total weight of acrylated phosphated glycidyl acrylate copolymer and reactive diluent.

In order to be useful as radiation curable coating compositions, the acrylated phosphated copolymers must be formulated with reactive diluents as described hereinbefore. The amount of reactive diluent utilized will vary depending on the viscosity desired in the coating composition and on the properties in the cured coating. Such amounts will vary from about 20 to about 75 weight percent based on the total weight of the coating composition. Any reactive diluent utilized in the preparation of the acrylated, phosphated glycidyl acrylate copolymer is considered to be reactive diluent in the formulated product.

The compositions of the instant invention are useful in photocurable systems and may be cured by ultraviolet light, electron beam, curtain coaters, and any other type of system which utilizes photons to activate the polymerization of the unsaturated materials prepared herein. The compositions of this invention can be applied by conventional means, including brushing, spraying, dipping, curtain and roll coating techniques, and may, if desired, be dried under ambient or oven conditions.

In order to render the compositions of the instant invention photocurable by ultraviolet light radiation, it is common to employ photosensitizers, such as benzoin, acetophenone, alkylphenone, benzophenone, tricyclic fused ring, pyridal, benzoin ethers, benzil, benzil ketals, alpha-acryloxime ethers, and the like, all as disclosed in U.S. Pat. No. 4,207,155. The photosensitizers are added to the compositions in amounts ranging from about 0.1 to about 15.0 percent by weight, based on the total curable system, preferably, from about 1.0 to about 5.0 percent. Although not required, certain organic amine-type activators may be added to these compositions to further enhance the cure rate in amounts ranging up to about 500 percent by weight, based on the photosensitizer, preferably, up to about 50 percent by weight. The amines are further described in the above patent.

As previously stated, the compositions of the instant invention find particular utility when used in ultraviolet curable systems to provide coatings for metal, e.g., iron, steel, copper, aluminum and the like.

In the following examples all parts and percentages are by weight unless otherwise indicated.

EXAMPLE 1

To a suitable reactor equipped with a stirrer, thermometer, condenser and dropping funnel were added 86.6 parts of a diglycidyl ether of hydrogenated Bisphenol A having an epoxide equivalent weight of 235. To the dropping funnel were added 501.8 parts of butyl acrylate, 66.2 parts of methyl methacrylate, 85.9 parts of glycidyl methacrylate, 6.6 parts of n-octyl mercaptan and 22.0 parts of 2-t-butylazo-2-cyanobutane. Heat was applied raising the temperature in the reactor to 132° C. Slow addition of the monomer solution from the dropping funnel was begun and continued over a three hour period with the temperature being held at 132° C. After holding the temperature at 132° C. for one additional hour, the temperature was lowered to 110° C. 33.3 parts of acrylic acid, 1.2 parts of an esterification catalyst—a chromium metal complex having a boiling point of 280° C., a viscosity of 1,325 cps at 25° C. and a specific gravity of 1.027 gm/cc—and 0.4 part of hydroquinone were added. Heating was continued at 110° C. until the epoxide equivalent weight of the reactants was 1867. Ethoxyethoxyethyl acrylate, 208.2 parts, was added and the temperature was lowered to 66° C. A solution of 24.8 parts of 85% phosphoric acid and 3.9 parts of water were slowly added while holding the temperature below 100° C. The resulting resinous product had an acid value of 20.8 and an epoxide equivalent weight of 18,612. The viscosity at 66° C. was 5,600 cps.

EXAMPLE 2

To a suitable reactor equipped as described in Example 1 were added 98.4 parts of a diglycidyl ether of hydrogenated Bisphenol A having an epoxide equivalent weight of 235. To the dropping funnel were added 569.7 parts of butyl acrylate, 75.1 parts of methyl methacrylate, 97.6 parts of glycidyl methacrylate, 7.5 parts of n-octyl mercaptan and 25 parts of 2-t-butylazo-2-cyanobutane. The temperature in the reactor was raised to 132° C. and the dropping funnel contents were added over a three hour period while holding the temperature at 132° C. Heating at 132° C. was continued to complete the conversion of monomers to polymer. The temperature was lowered to 110° C. and 37.8 parts of acrylic acid, 1.3 parts of the esterification catalyst described in Example 1 and 0.4 part of hydroquinone were added. The temperature was held at 110° C. until the epoxide equivalent weight of the reactants was 1867. Ethoxyethoxyethyl acrylate, 244.5 parts, was added and the temperature was lowered to 66° C. A solution of 56.4 parts of 85% phosphoric acid and 8.8 parts of water were added slowly while holding the temperature below 100° C. The reaction was continued until the acid value was 45.7 and the epoxide equivalent weight was 81,240. The resinous product had a viscosity at 66° C. of 1,800 cps.

EXAMPLE 3

To a suitable reactor were added 236.5 parts of a diglycidyl ether of Bisphenol A having an epoxide equivalent weight of 185. To the dropping funnel were added 405.4 parts of butyl acrylate, 143.9 parts of vinyl acetate, 173 parts of glycidyl methacrylate, 20.9 parts of 2,2'-azobis(isobutyronitrile) and 20.3 parts of n-octyl mercaptan. The temperature in the reactor was raised to 104° C. and the dropping funnel contents were added over a three hour period while holding the temperature at 99°–104° C. At the completion of the polymerization reaction, 137 parts of acrylic acid, 3 parts of the esterification catalyst described in Example 1 and 1 part of hydroquinone were added. The temperature was held at 104° C. until the acid value was measured as 0.27 and the epoxide equivalent weight was 2844. The temperature was lowered to 71° C. and a solution of 68 parts of 85% phosphoric acid and 21 parts of water was added. The temperature was held at 70°–80° C. until the acid value was 55.9 and the epoxide equivalent weight was 21,950. The resulting resinous product had a viscosity at 66° C. of 11,075 cps.

The resinous product, 65 parts, was blended with 20 parts of hydroxypropyl methacrylate, 10 parts of isobornyl acrylate, 5 parts of trimethylolpropane triacrylate and 3 parts of hydroxycyclohexylphenyl ketone. Films were drawn down on Q panels using a #3 Meyer Rod. The films were cured by ultraviolet radiation using a Fusion Systems Model K-523 Unit using two 200 watt lamps at a line speed of 50 ft./min.

Adhesion of the cured coatings to the substrate was determined to be 100% using the following test procedure. The coatings were crosshatched with scratch lines so as to form 100 squares. The crosshatched area was covered with a No. 600 Scotch Brand Cellophane tape from 3M and even pressure was applied to the tape so that it would adhere evenly to the coating. The tape was then pulled from the coating and the percent adhesion was determined by counting the squares which were removed by the tape.

The methyl ethyl ketone resistance of the cured coatings was 2 double rubs.

Another formulation was prepared from 65 parts of the resinous product, 35 parts of isobornyl acrylate and 3 parts of hydroxycyclohexylphenyl ketone. Films were drawn down on black plate, aluminum foil, copper foil, Q panels and galvanized steel panels and were cured using the procedure described hereinbefore. The adhesion on the black plate, aluminum foil and Q panels was 100%; on the galvanized steel 95%; and on the copper foil 0%. Methyl ethyl ketone resistance on Q panels and galvanized steel panels was 1 and 2 double rubs respectively.

Another formulation was made from 65 parts of the resinous product, 35 parts of hydroxypropyl methacrylate and 3 parts of hydroxycyclohexylphenyl ketone. Films were drawn down on Q panels and galvanized steel panels and were cured as described hereinbefore. The adhesion on the Q panels was 100% and on the galvanized steel panels 25%. Methyl ethyl ketone resistance was 1 double rub for each panel.

Another formulation was made from 65 parts of the resinous product, 35 parts of ethoxyethoxyethyl acrylate and 3 parts of hydroxycyclohexylphenyl ketone. Films were prepared on black plate, aluminum foil, copper foil and Q panels and were cured as described hereinbefore. The adhesion on the aluminum foil and copper foil was 0%, on the black plate it was 10% and on the Q panels it was 100%. Methyl ethyl ketone resistance on the Q panels was 1½ double rubs.

Still another formulation was made from 65 parts of the resinous product, 30 parts of isobornyl acrylate, 5 parts of trimethylolpropane triacrylate and 3 parts of hydroxycyclohexylphenyl ketone. Films were prepared on black plate, aluminum foil, copper foil and Q panels and were cured using the procedure described hereinbefore. The adhesion on all of the substrates was 100%. Methyl ethyl ketone resistance on the Q panel coating was 1 double rub.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A radiation curable composition comprising the reaction product of
   (a) an acrylate copolymer containing pendant glycidyl ester groups, and
   (b) acrylic acid or methacrylic acid plus
   (c) phosphoric acid
wherein the acrylate copolymer (a) is a copolymer of about 5 to about 75 weight percent, based on the total weight of the copolymer, glycidyl acrylate or methacrylate with the remainder being an ethylenically unsaturated monomer copolymerizable therewith, wherein (b) is reacted with the glycidyl ester groups in the amount of about 25 to about 75 percent of the equivalents of the glycidyl ester groups, and wherein (c) is reacted with the remainder of the glycidyl ester groups in the amount of about 0.5 to about 1 mole per glycidyl ester group in the presence of at least about one equivalent of hydroxyl group-containing material per mole of (c).

2. The composition of claim 1 wherein the acrylate copolymer contains about 10 to about 50 weight percent glycidyl acrylate or methacrylate.

3. The composition of claim 1 wherein the acid is acrylic acid.

4. The composition of claim 1 wherein the acid is methacrylic acid.

5. The composition of claim 1 wherein the hydroxyl group-containing material is water.

6. The composition of claim 1 wherein the hydroxyl group-containing material is an aliphatic hydroxyl group-containing compound.

7. The composition of claim 6 wherein the aliphatic hydroxyl group-containing material is a $C_1$–$C_{20}$ alcohol.

8. The composition of claim 1 wherein the copolymer is a copolymer of glycidyl acrylate.

9. The composition of claim 1 wherein the copolymer is a copolymer of glycidyl methacrylate.

10. A process for preparing an ultraviolet curable composition which produces good adhesion to metal in cured state coatings which comprises reacting
    (a) an acrylate copolymer containing pendant glycidyl ester groups with
    (b) acrylic acid or methacrylic acid plus
    (c) phosphoric acid
wherein the acrylate copolymer (a) is a copolymer of about 5 to about 75 weight percent, based on the total weight of the copolymer, glycidyl acrylate or methacrylate with the remainder being an ethylenically unsaturated monomer copolymerizable therewith, wherein (b) is reacted with the glycidyl ester groups in the amount of about 25 to about 75 percent of the equivalents of the glycidyl ester groups and wherein (c) is reacted with the remainder of the glycidyl ester groups in the amount of about 0.5 to about 1 mole per glycidyl ester group in the presence of at least about one equivalent of hydroxyl group-containing material per mole of (c).

11. The process of claim 10 wherein the acrylate copolymer contains about 10 to about 50 weight percent glycidyl acrylate or methacrylate.

12. The process of claim 10 wherein the acid is acrylic acid.

13. The process of claim 10 wherein the acid is methacrylic acid.

14. The process of claim 10 wherein the hydroxyl group-containing material is water.

15. The process of claim 10 wherein the hydroxyl group-containing material is an aliphatic hydroxyl group-containing compound.

16. The process of claim 15 wherein the aliphatic hydroxyl group-containing material is a $C_1$–$C_{20}$ alcohol.

17. The process of claim 10 wherein the copolymer is a copolymer of glycidyl acrylate.

18. The process of claim 10 wherein the copolymer is a copolymer of glycidyl methacrylate.

* * * * *